U. G. CASSADY.
DIMMING LENS FOR HEADLIGHTS.
APPLICATION FILED AUG. 10, 1917.
1,260,966.
Patented Mar. 26, 1918.
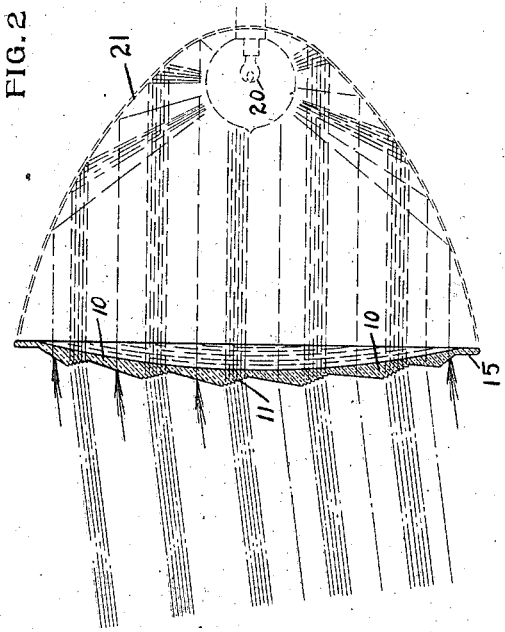
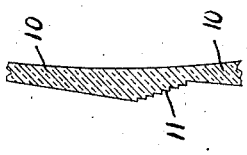
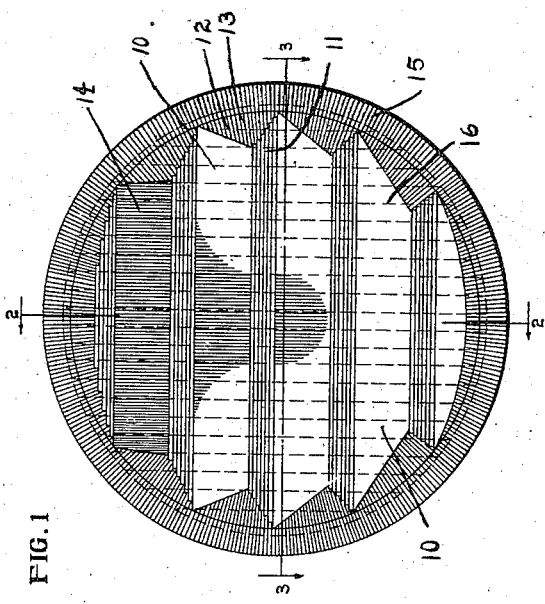
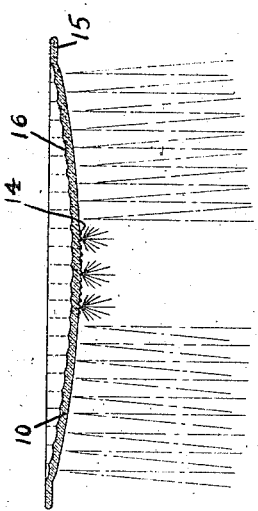
Witness
Edgar M. Matthews
Inventor
Ulysses G. Cassady.
By
Hood & Schley.
Attorneys

UNITED STATES PATENT OFFICE.

ULYSSES G. CASSADY, OF INDIANAPOLIS, INDIANA, ASSIGNOR TO PRIMOLITE COMPANY, OF INDIANAPOLIS, INDIANA, A CORPORATION OF INDIANA.

DIMMING-LENS FOR HEADLIGHTS.

1,260,966.  Specification of Letters Patent.  Patented Mar. 26, 1918.

Application filed August 10, 1917. Serial No. 185,412.

*To all whom it may concern:*

Be it known that I, ULYSSES G. CASSADY, a citizen of the United States, residing at Indianapolis, in the county of Marion and State of Indiana, have invented a new and useful Dimming-Lens for Headlights, of which the following is a specification.

It is the object of my invention to produce a diffusing and deflecting lamp glass or lens for automobile headlights, which will prevent the disagreeable and dangerous glare, will deflect a portion of the light slightly downward so as to light the road at a suitable distance ahead, will slightly diffuse horizontally this downwardly deflected portion of the light so that the light spot on the road ahead will be of suitable width to cover the full width of passage for the automobile and wider than the direct beam of light from the headlight, and will diffuse widely horizontally but very slightly if at all vertically the remainder of the light so as to illuminate the sides of the road and the road itself directly in front of the automobile for some distance ahead. My present invention is in some features an improvement on that covered by my Patent No. 1,230,670, granted June 19, 1917, and gives a better distribution and utilization of the light rays, as well as being easier and less expensive of manufacture.

The accompanying drawing illustrates my invention. Figure 1 is a front elevation of a lamp glass embodying my invention; Fig. 2 is a section on the line 2—2 of Fig. 1; Fig. 3 is a section on the line 3—3 of Fig. 1; and Fig. 4 is an enlarged fragmentary section corresponding to a central part of Fig. 2.

The lamp glass consists primarily of a plurality of main clear prismatic portions 10 having their front and rear faces relatively oblique and the thin edges of such portions upward, and between the thicker lower edge of each of these main prismatic portions and the thinner upper edge of the adjacent lower main prismatic portion a series of clear but smaller prismatic portions 11, connecting the two adjacent main portions by a series of steps of which each step is itself a prism having light deflecting surfaces exactly corresponding to the light deflecting surfaces of the adjacent main prismatic portions. The main prismatic portions 10 and the smaller prismatic portions 11 both extend horizontally, across the lamp glass. At the horizontal ends of these prismatic portions 10 and 11 are beveled portions 12, which are covered with substantially radial ribs 13 which diffuse the light by refraction, rather generally. Each rib diffuses the light by refraction substantially in a plane at right angles to such rib. In addition, the upper main prismatic portion 10 and the central parts of one or two of the next lower main prismatic portions are provided on their front faces with a series of vertical ribs 14, which by refraction diffuse the light passing through them widely horizontally, and only very slightly if at all vertically, as indicated by Figs. 3 and 2 respectively. These light diffusing ribs 14 are preferably not provided on the narrow prismatic portions 11, but only on the wide or main prismatic portions 10 near the top of the lamp glass. The beveled portions 12 merge into an annular flange 15, which may also be provided with radial ribs which are continuations of the ribs 13. The ribs on this annular flange serve no optical purpose, ordinarily, as this flange 15 is merely a clamping flange and is covered in operation; but serve to prevent the glass from turning in its frame, so that it will remain in proper position in spite of the jarring of the associated automobile.

For convenience in manufacture, the lamp glass is made as one integral piece, conveniently slightly bulging, so that as a whole it forms a section of a sphere. The inner or rear face of the lamp glass is preferably continuous across the various sections 10, 11, and 12, and the prisms are formed by oblique surfaces on the front face of the lamp glass. The prismatic portions 10 and 11, when the lamp glass is made as a spherical segment as shown, are curved slightly horizontally, but this does not interfere with the prismatic effect on the light rays. By reason of this prismatic effect, the light rays are deflected obliquely downward through both the prismatic portions 10 and the prismatic portions 11, as is clear from Fig. 2. The continuous rear face of the lamp glass is vertically fluted, as is clear from Fig. 3. The cylindrical surfaces of these flutes 16 produce by refraction a slight dispersion of the light rays horizontally. The flutes may be either convex or concave, but I prefer to make them as concave grooves 16 extending vertically across the inner face of the lamp glass, because with concave flutes the foci of the dispersed light rays are virtual and not real. While I prefer to have the flutes 16 on the rear face and the oblique prism faces on the front face of the lamp glass, this is not essential, and either the flutes or the oblique faces may be on either or both sides of the lamp glass.
In operation, the light rays from the lamp 20 strike the reflector 21 and are sent forward as parallel rays, as indicated in Fig. 2. Of these parallel rays, some pass through the clear prisms 10, some through the small clear prisms 11, and some through the ribs 13 and 14. The rays which pass through the clear prismatic portions 10 and 11 are refracted slightly downward, as is clear from Fig. 2, because the thin edges of these prismatic portions 10 and 11 are upward. The flutes 16, which optically are cylinders superposed on the prisms, produce, also by refraction, a slight horizontal dispersion of these downwardly refracted light rays, as is clear from Fig. 3, so as to produce a light spot on the road ahead some distance in front of the automobile and of the desired width, preferably sufficient to light something more than the full path of passage of the automobile. The rays which pass through the ribs 13 and 14 are dispersed, also by refraction, substantially in planes at right angles to such ribs, with practically no dispersion longitudinally of the ribs.
The whole action is one of refraction, for all parts of the lamp glass. The effect of the flutes 16 on the rays which pass through the ribs 13 and 14, though actually the same as upon the rays of light which pass through the clear portions, is in effect negligible because of the much greater refraction which takes place at such ribs.

As a result of all this, a large portion of the parallel rays from the reflector 21 are deflected slightly downward and spread out slightly horizontally to produce a light spot of the desired width on the road at the desired distance ahead. Most of the remainder of such parallel rays are diffused horizontally by the ribs 14 to produce a general illumination of the road sides, and the rays still remaining are diffused generally in all directions by the ribs 13 to assist in this general illumination of the roadsides and to extend it vertically as well as horizontally. The angle of this general illumination is greater than 180° both vertically and horizontally, because of the different angles of the portions 12; but the bulk of the light is used to produce the desired light spot on the road ahead or to light the sides of the roads, and very little is thrown upward and lost. In addition, the cost of manufacture of this lens where the entire action is by refraction is much reduced, because the lens can be molded complete in one operation, and removed from the mold in condition for immediate use without requiring any additional labor. Moreover, all glare from the headlight is eliminated, so that it does not blind those approaching it.

I claim as my invention:

1. A lamp glass, comprising a vertical series of main horizontally extending prismatic portions having their thin edges uppermost, and a vertical series of smaller horizontally extending prismatic portions connecting the lower edge of a main prismatic portion with the adjacent upper edge of the next lower main prismatic portion by a series of steps, said smaller prismatic portions being substantially similar in prismatic effect to the adjacent main prismatic portions.

2. A lamp glass, comprising a vertical series of main horizontally extending prismatic portions having their thin edges uppermost, and a vertical series of smaller horizontally extending prismatic portions connecting the lower edge of a main prismatic portion with the adjacent upper edge of the next lower main prismatic portion by a series of steps.

3. A lamp glass, comprising a vertical series of main horizontally extending prismatic portions having their thin edges uppermost, and a vertical series of smaller horizontally extending prismatic portions connecting the lower edge of a main prismatic portion with the adjacent upper edge of the next lower main prismatic portion by a series of steps, said smaller prismatic portions being substantially similar in prismatic effect to the adjacent main prismatic portions, said main and smaller prismatic portions having superposed thereon a plurality of vertically extending cylindrical portions.

4. A lamp glass, comprising a vertical series of main horizontally extending prismatic portions having their thin edges uppermost, and a vertical series of smaller horizontally extending prismatic portions connecting the lower edge of a main prismatic portion with the adjacent upper edge of the next lower main prismatic portion by a series of steps, said main and smaller prismatic portions having superposed thereon a plurality of vertically extending cylindrical portions.

5. A lamp glass, comprising a vertical series of main horizontally extending prismatic portions having their thin edges uppermost, and a vertical series of smaller horizontally extending prismatic portions connecting the lower edge of a main prismatic portion with the adjacent upper edge of the next lower main prismatic portion by a series of steps, some of said main prismatic portions being provided with a plurality of narrow vertical ribs which refract the transmitted light widely in a horizontal direction.

6. A lamp glass, comprising a vertical series of main horizontally extending prismatic portions having their thin edges uppermost, and a vertical series of smaller horizontally extending prismatic portions connecting the lower edge of a main prismatic portion with the adjacent upper edge of the next lower main prismatic portion by a series of steps, said lamp glass being provided on one face with a plurality of vertical concave flutes of small curvatures and on part of the other face with narrow vertical ribs of great curvature.

7. A lamp glass, comprising a vertical series of main horizontally extending prismatic portions having their thin edges uppermost, and a vertical series of smaller horizontally extending prismatic portions connecting the lower edge of a main prismatic portion with the adjacent upper edge of the next lower main prismatic portion by a series of steps, said lamp glass being provided on one face with a plurality of vertical flutes of small curvature and on part of the other face with narrow vertical ribs of great curvature.

8. A lamp glass, comprising a vertical series of main horizontally extending prismatic portions having their thin edges uppermost, and a vertical series of smaller horizontally extending prismatic portions connecting the lower edge of a main prismatic portion with the adjacent upper edge of the next lower main prismatic portion by a series of steps, said lamp glass being provided on one face with a plurality of vertical flutes of small curvature which cross both the main and smaller prismatic portions, and on part of the other face with narrow vertical ribs of great curvature.

9. A lamp glass comprising a vertical series of horizontally extending light-transmitting prismatic portions having their thin edges uppermost, some but less than all of said portions being provided with vertical ribs of great curvature so as to produce a wide horizontal light diffusion, and others of said portions being clear of such ribs so that they transmit the light without producing such wide horizontal light diffusion.

In witness whereof, I have hereunto set my hand at Indianapolis, Indiana, this seventh day of August, A. D. one thousand nine hundred and seventeen.

ULYSSES G. CASSADY.